US010589202B2

(12) United States Patent
Gomes Gama et al.

(10) Patent No.: US 10,589,202 B2
(45) Date of Patent: Mar. 17, 2020

(54) COMPONENT FOR A FLUID FILTER, AND FLUID FILTER

(75) Inventors: Vasco Gomes Gama, Madrid (ES); Carlos J. Blasco Remacha, Azuqueca de Henares (ES)

(73) Assignee: Robert Bosch GmbH, Stuttgart (DE)

( * ) Notice: Subject to any disclaimer, the term of this patent is extended or adjusted under 35 U.S.C. 154(b) by 2138 days.

(21) Appl. No.: 12/042,641

(22) Filed: Mar. 5, 2008

(65) Prior Publication Data

US 2008/0217231 A1 Sep. 11, 2008

(30) Foreign Application Priority Data

Mar. 5, 2007 (DE) .......... 10 2007 010 503

(51) Int. Cl.
| | | |
|---|---|---|
| *B01D 35/18* | (2006.01) | |
| *B01D 27/08* | (2006.01) | |
| *B01D 35/00* | (2006.01) | |
| *F02M 37/22* | (2019.01) | |
| *B01D 29/60* | (2006.01) | |
| *B01D 36/00* | (2006.01) | |
| *F02M 37/30* | (2019.01) | |

(52) U.S. Cl.
CPC .......... *B01D 35/18* (2013.01); *B01D 29/605* (2013.01); *B01D 36/005* (2013.01); *F02M 37/30* (2019.01)

(58) Field of Classification Search
CPC ..... B01D 29/605; B01D 35/18; B01D 36/005
USPC ........................................................ 210/184
See application file for complete search history.

(56) References Cited

U.S. PATENT DOCUMENTS

| | | | | |
|---|---|---|---|---|
| 4,428,351 A | * | 1/1984 | Davis ............................ | 123/557 |
| 4,476,028 A | * | 10/1984 | Harris ........................... | 210/774 |
| 4,477,715 A | * | 10/1984 | Bell et al. ..................... | 219/205 |
| 4,680,110 A | * | 7/1987 | Davis ..................... | B01D 17/00 |
| | | | | 123/557 |
| 5,855,772 A | | 1/1999 | Miller et al. | |
| 6,402,943 B1 | * | 6/2002 | Bohlender ................... | 210/184 |
| 2006/0070956 A1 | | 4/2006 | Herrmann et al. | |

FOREIGN PATENT DOCUMENTS

| | | |
|---|---|---|
| DE | 37 01 259 A1 | 7/1987 |
| DE | 100 29 539 A1 | 12/2001 |
| DE | 10 2004 048 565 A1 | 4/2006 |
| DE | 10 2004 054 625 A1 | 5/2006 |

(Continued)

OTHER PUBLICATIONS

U.S. Appl. No. 12/042,641—Interview Summary dated Mar. 25, 2015, 3 pages.*

(Continued)

*Primary Examiner* — Bobby Ramdhanie
*Assistant Examiner* — Denise R. Anderson
(74) *Attorney, Agent, or Firm* — Maginot, Moore & Beck LLP

(57) ABSTRACT

The present invention relates to a fuel filter component containing a heating device for heating a fluid; a detection device for detecting a level of a further fluid, located in a reservoir; and an outlet conduit for the further fluid. The component is a one-piece component, in particular the heating device, detection device, and outlet conduit are embodied. The present invention further relates to a fluid filter, in particular a fuel filter, having such a component.

20 Claims, 3 Drawing Sheets

(56) References Cited

FOREIGN PATENT DOCUMENTS

| | | |
|---|---|---|
| DE | 10 2007 010 503 A1 | 9/2008 |
| DE | 20 2006 020 790 U1 | 6/2010 |
| DE | 10 2007 010 503 B4 | 12/2017 |
| EP | 1 188 468 A1 | 3/2002 |
| EP | 1 450 031 A1 | 8/2004 |
| EP | 1 702 662 A1 | 9/2006 |
| EP | 1 750 824 B1 | 2/2007 |
| EP | 1 188 468 B1 | 5/2009 |
| FR | 2 883 198 A1 | 9/2006 |
| GB | 2 129 329 A | 5/1984 |
| WO | WO 2005118102 A1 * | 12/2005 ........... B01D 35/143 |

OTHER PUBLICATIONS

Oxford Dictionary, "The Concise Oxford Dictionary, Tenth Edition," ed Judy Pearsall, pub. Oxford University Press, New York, 1999, 4 pages.*

* cited by examiner

COMPONENT FOR A FLUID FILTER, AND FLUID FILTER

CROSS-REFERENCE TO RELATED APPLICATIONS

This application is based on German Patent Application No. 10 2007 010 503.9 filed 5 Mar. 2007, upon which priority is claimed.

BACKGROUND OF THE INVENTION

Field of the Invention

The present invention relates to a component for a fluid filter, in particular a fuel filter, that contains a heating device for heating a fluid.

Description of the Prior Art

Filter components of the type with this invention is concerned are used in particular in fluid filters of the kind disposed in a motor vehicle. In that case, the fluid is a fuel, such as diesel, and accordingly the fluid filter is a fuel filter. As the fuel filter, the fluid filter serves to filter out contaminants contained in the fuel. Water contained in the fuel is also to be filtered out. Thus not only disruptions and damage to the fuel system, which in particular includes a driving engine for driving the motor vehicle, but also poor fuel combustion in the engine, can be avoided. The water acts as a further fluid. To reduce the viscosity of the fluid, or in other words for instance the fuel, it is heated by means of the heating device. As a result, the fluid can flow through the fluid filter better. The filtering action is improved. The water filtered out by the fluid filter, or in other words the further fluid, can be collected in a reservoir, which serves as a water storage chamber. Typically, a detection device is provided, which serves to detect a level of the water located in the reservoir. If in the course of operation of the fluid filter the level is reached because of the accumulation of the water, then this is ascertained by the detection device, and accumulated water is drained from the reservoir. To that end, an outlet conduit for draining the water may be provided. Typically, the heating device, detection device, and outlet conduit are embodied as individual components separate from one another, which must be manufactured individually and assembled individually. This is complicated and expensive.

OBJECT AND SUMMARY OF THE INVENTION

The object of the present invention is to make simple construction of a fluid filter possible. According to the invention, the component is a one-piece component, in which the heating device, the detection device, and the outlet conduit are embodied. The fluid filter of the invention includes one such one-piece component according to the invention. Because of the invention, advantageously three functions can be attained in a single component, namely heating the fluid, detecting the level of the further fluid, and carrying away the further fluid. The component can be of an especially space-saving design. Moreover, assembling the fluid filter takes little time and is quite simple as well. In addition, the component can be made economically, and this then applies to the fluid filter as well. The heating device, detection device and outlet conduit are thus advantageously disposed in common in a single component. For the heating device and the detection device, suitable receptacles are advantageously present in which the heating device and the detection device can be placed. The heating device, detection device and outlet conduit are advantageously joined together, in particular integrally, in the component. The component of the invention can be an individual injection-molded part that is formed in particular of plastic. The further fluid is in particular a further fluid filtered out of the fluid. This filtering can be done above all by means of the fluid filter.

In an advantageous feature of the invention, an inlet for carrying the fluid to the heating device and an outlet for carrying away the fluid heated by the heating device are embodied in the one-piece component. This advantageously makes it possible to carry the fluid to and away from the heating device simply and reliably.

In a further, especially advantageous feature, an inlet for carrying the further fluid to the outlet conduit and an outlet for carrying the further fluid away from the outlet conduit are integrally joined to the outlet conduit. This advantageously makes it possible to carry the fluid to and away from the outlet conduit simply and reliably. In particular, the inlet can communicate with the reservoir.

Preferably, an electrical plug is embodied in the one-piece component. As a result, the component and its electrical components can be connected in an especially simple way to other electrical components. The plug makes it possible to connect the component electrically to an electrical system in a protected, reliable way.

Especially preferably, an electric control device for controlling the heating device is disposed in the one-piece component. The control device can advantageously be adapted especially precisely to the function of the heating device. Since the control device can be placed quite close to the heating device, short connecting lines can be attained between the control device and the heating device. This can limit possible causes of trouble. A receptacle for receiving the electric control device is advantageously embodied in the component.

Moreover, advantageously, the electric control device is additionally embodied for controlling the detection device. In this way, with the control device, two functions provided in the component can be controlled. There is no need to provide separate control devices for the heating device and for the detection device. Advantageously, this additionally reduces the amount of space required and the production costs.

Especially preferably, a fluid conduit for transporting the fluid is embodied parallel to the outlet conduit for the further fluid. This makes an especially compact arrangement possible. The outlet conduit and the fluid conduit can be located separately from one another in a tight space.

Moreover, advantageously, the heating device is embodied in the fluid conduit. The heat generated by the heating device can as a result be transferred to the fluid especially efficiently. Moreover, an especially compact design of the component is advantageously attainable.

Especially preferably, the fluid is a fuel, in particular diesel fuel; the further fluid is water separated from the fuel; and the fluid filter is a fuel filter. The present invention is especially advantageous in that case. In a motor vehicle in which the available space, especially in the engine compartment, is very tight, the fuel filter is particularly advantageous, since the component of the invention can be quite compact.

In a further advantageous feature of the invention, a temperature sensor, in particular in the form of an NTC element, is embodied in the one-piece component. This makes it possible, without major additional expense, to integrate a further advantageous function in the component.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
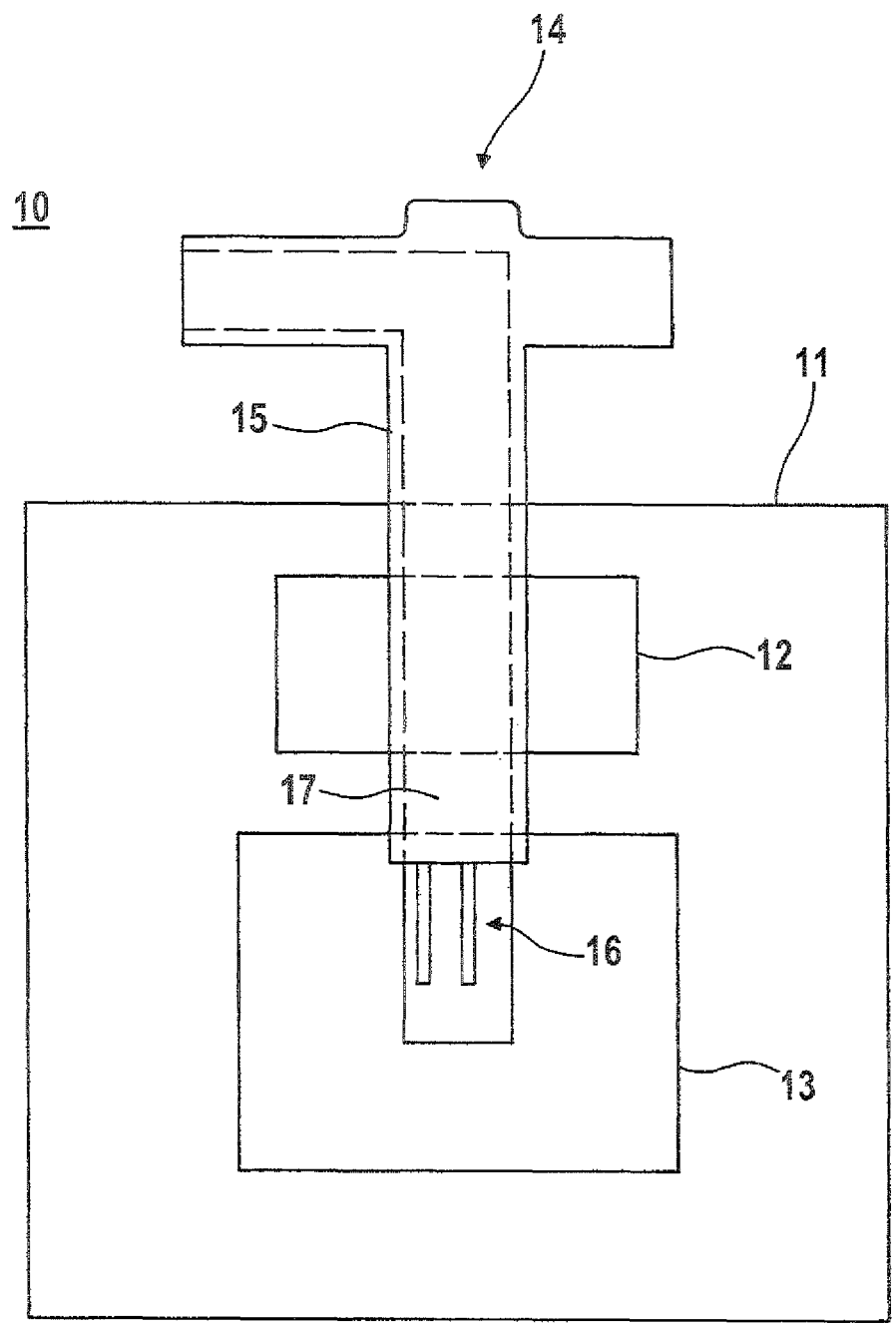
FIG. 1 is a schematic basic illustration of an exemplary embodiment of a fluid filter of the invention, which is designed as a fuel filter and has a component according to the invention.

In the drawings, unless otherwise noted, elements that are the same or that function the same are identified by the same reference numerals throughout.

FIG. 1 is a schematic illustration of a fluid filter according to the invention, which is designed as a fuel filter 10. In a motor vehicle, the fuel filter 10 is used for cleaning fuel. The fluid in the present sense is accordingly fuel. In this case, the fuel is diesel, and the fluid filter is thus a diesel filter. The fuel filter has a housing 11 of cup-shaped design, in which a filter element 12 is disposed. The filter element 12 is approximately cylindrical in shape and makes a material available that is used for the actual filtering of the fuel. The fuel delivered to the fuel filter 10 from outside is therefore carried to the filter element 12 for cleaning. Cleaning the fuel includes filtering out the water contained in the fuel. In the present sense, the water represents a further fluid. For catching and collecting the filtered-out water, the fuel filter 10 includes a water reservoir 13. The water filtered out of the fuel is carried into this reservoir 13. The fuel filter 10 has a component 14 according to the invention. With an elongated shaft 15, the component 14 protrudes partway into the interior of the housing 11. On a lower end of the shaft 15, there is a detection device 16 for detecting a level of the water located in the reservoir 13. The detection device 16 acts as a water sensor, which here has two electrodes for detecting the water level. It is equally possible to provide only a single electrode. Once the level predetermined by the disposition of the detection device is reached, then at least some of the water located in the reservoir 13 is drained out of the reservoir 13. To that end, there may be a pump that pumps the water out of the reservoir 13. The component 14 includes an outlet conduit 17, through which the water, drained from the reservoir 13, is pumped out of the fuel filter 10.

Figure 2:
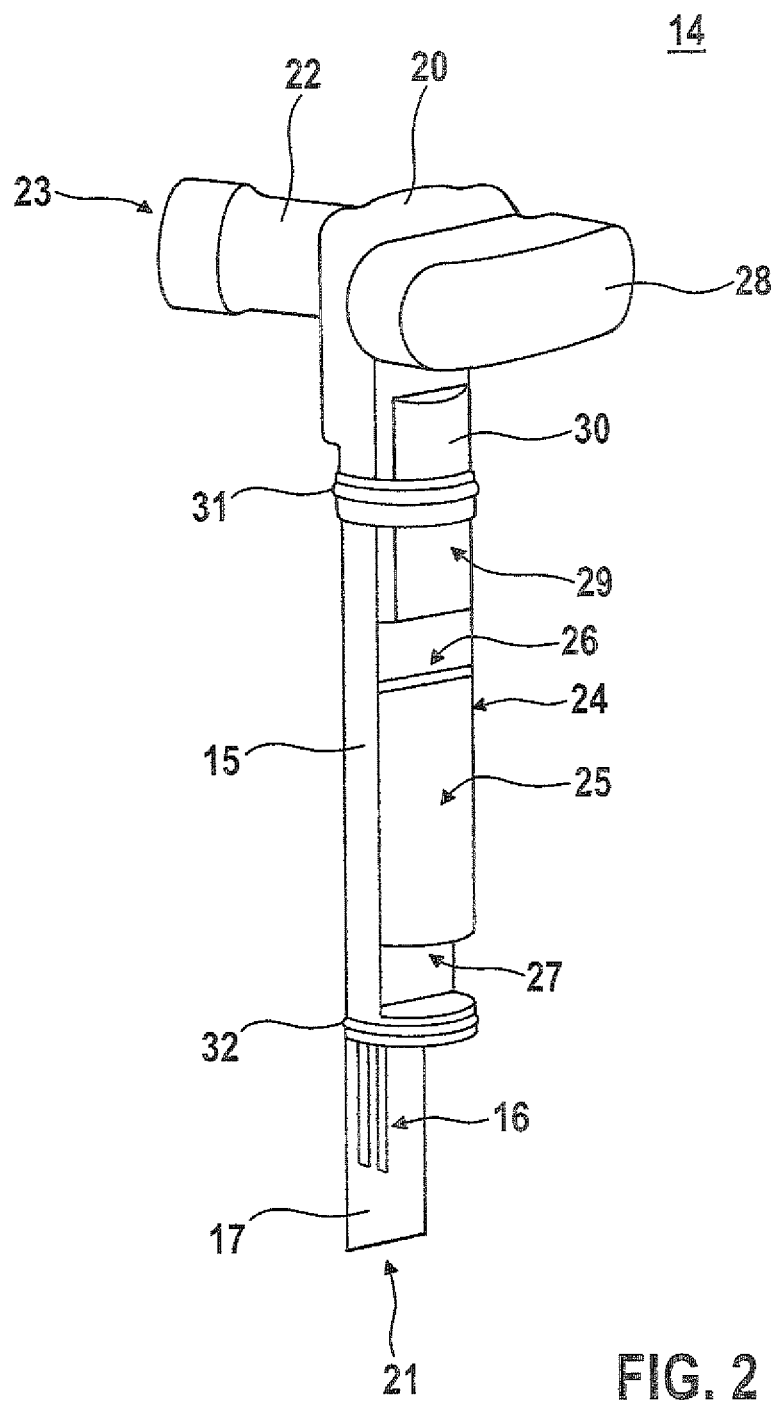
FIG. 2 is a perspective of an exemplary embodiment of the component of the invention.

FIG. 2 shows a perspective view in greater detail of the component 14 according to the invention. The component 14 is a one-piece component, which has a housing 20 and which in the present exemplary embodiment is a plastic injection-molded part. The one-piece component 14 contains the detection device 16 for detecting the water level in the reservoir 13. The two electrodes of the detection device 16 can be seen in FIG. 2, disposed and secured in suitable receptacles for the electrodes that are embodied in the component 14. The component 14 further includes the outlet conduit 17 for carrying away the water. On a lower end of the elongated shaft 15 of the component 14, an inlet 21 is provided, for carrying the water to the outlet conduit 17. On an upper end of the component 14, there is an outlet 22 for carrying away the water, transported through the outlet conduit 17, from the component 14 and thus out of the fuel filter 10. The outlet 22 has a hollow-cylindrical shape and extends horizontally. On an upper end of the shaft 15, the outlet 22, with an open face end, adjoins the outlet conduit 17 embodied in the shaft 15. The other face end of the outlet 22 has an opening 23, where the water that has been carried away can leave the outlet conduit 17. In the component 14, the outlet conduit 17 is embodied adjoining an outer wall of the component 14, and beginning at the inlet 21 located at the lower end, it extends essentially vertically through the elongated shaft 15 and then horizontally through the outlet 22 as far as its opening 23.

The component 14 further contains a fluid conduit 24 for transporting fuel supplied to the component 14. In the present exemplary embodiment, a heating device 25 for heating the fuel is disposed in this fluid conduit 24. The fluid conduit 24 in this respect acts as a receptacle for the heating device 25. The heating device 25 may for instance have so-called PTC heating elements. For controlling the thermal output, a temperature sensor, not identified by reference numeral, may alternatively or additionally be provided on the component 14. It is also possible to dispose the heating device 25 adjoining the fluid conduit 24. For that purpose, a suitable receptacle region for receiving the heating device 25 is then provided in the component 14, next to the fluid conduit 24. An inlet 26 for carrying the fuel to the heating device 25 is embodied at an entrance to the fluid conduit 24, and an outlet 27 for carrying away the fuel heated by the heating device 25 is embodied at an exit from the fluid conduit 24. In the present exemplary embodiment, the fluid conduit 24 is disposed in the shaft 15, parallel to the outlet conduit 17. However, The fluid conduit 24 is shorter than the outlet conduit 17 through the shaft 15. The inlet 26 is embodied in the housing 20, on the outer wall of the shaft 15, above the outlet 27. From the outlet 27, the heated fuel is delivered to the filter element 12.

The component 14 further includes an electrical plug 28, which has electrical terminals. With the plug 28, the component can be connected electrically to other components of the motor vehicle. In particular, the plug 28 can be used for an electrical power supply to the component 14. For controlling the heating device 25 and the detection device 16, the component 14 has an electric control device 29. For the control device 29, a receptacle 30, in which the control device 29 is disposed, is embodied in the component 14. For supplying electrical power and exchanging signals, the control device 29 is connected to the plug 28 on the one hand and to the heating device 25 and the detection means 16 on the other. For sealing purposes relative to a cap of the housing 11 of the fuel filter 10, the component 14 has a seal 31, which is located above the inlet 26. For sealing off from the reservoir 13, there is a further seal 32, which is located below the outlet 27 and above the detection device 16.

Figure 3:
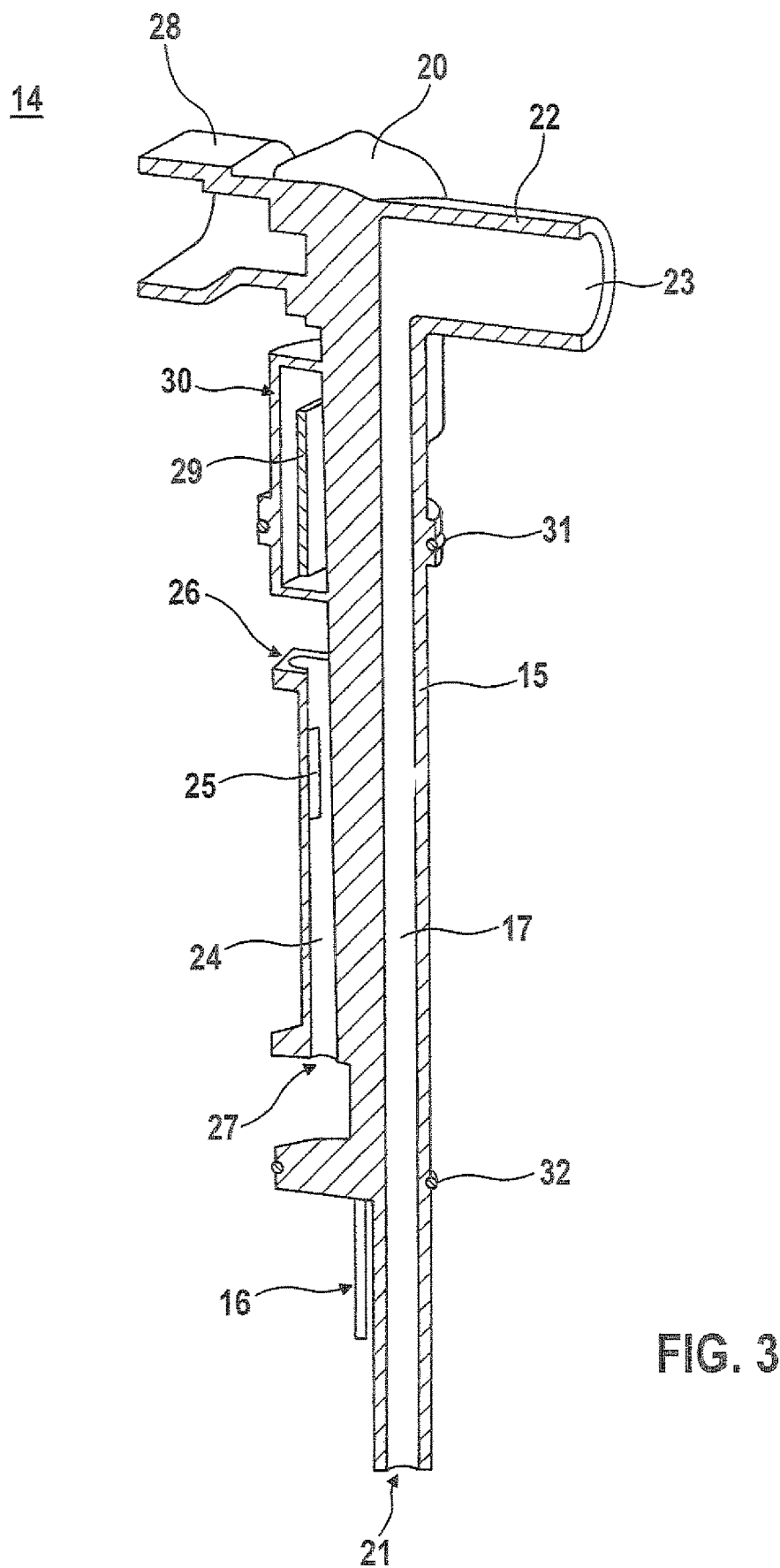
FIG. 3 is a sectional view of the exemplary embodiment of the component according to the invention shown in FIG. 2.

FIG. 3 shows a sectional view of the exemplary embodiment of the component 14 according to the invention shown in FIG. 2. In particular, it is a longitudinal section through the elongated shaft 15, the outlet 22, and the plug 28. The outlet conduit 17 can be seen, which extends from the inlet 21 on the lower end of the shaft 15 as far as the opening 23 of the outlet 22. The fluid conduit 24 is also shown, along with its inlet 26 and its outlet 27. In addition, the heating device 25 located in the fluid conduit 24 is shown schematically. The control device 29, which here may in particular include a printed circuit board with electronic components disposed on it, can be seen in the receptacle 30.

According to the invention, the component 14 is a one-piece component. This can be seen from FIG. 3. In this one-piece component 14, the outlet conduit 17, the heating device 25, and the detection device 16 are embodied. It is therefore advantageously possible to achieve at least three functions of the fuel filter 10 in the single, common, one-piece component 14. The one-piece component 14 is quite compact and can be disposed especially simply in the fuel filter 10. The fuel filter 10 can therefore be assembled especially simply. Because the control device 29 is provided jointly for both the heating device and the detection device 16, the control of these two components can be accomplished at very little effort or expense. Moreover, the plug 28 can be used both for the heating device 25 and for the detection device 16, for supplying electrical power and/or for transmitting signals from and/or to the heating device 25 and the detection device 16. This plug 28 used jointly for both the heating device 25 and the detection device 16 therefore makes a very compact, economical component 14 possible, and hence a very compact, economical fuel filter 10.

The foregoing relates to preferred exemplary embodiments of the invention, it being understood that other variants and embodiments thereof are possible within the spirit and scope of the invention, the latter being defined by the appended claims.

We claim:

1. A component for a fuel filter having a housing supporting a filter element therein, the filter element configured to filter water from the fuel and convey the water to a reservoir within the housing, the component comprising
    a heating device for heating the fuel within the housing,
    a detection device for detecting a level of the water in the reservoir of the housing separate from said component,
    an outlet conduit for conveying the water,
    a water inlet disposed in fluid communication with the reservoir of the housing when the component is supported within the housing and integrally joined to the outlet conduit, for carrying the water from the reservoir to the outlet conduit, and a water outlet separate from said water inlet and integrally joined to the outlet conduit, for carrying the water away from the outlet conduit, the water outlet configured to direct the water outside the housing when the water inlet is in communication with the reservoir, and
    a fuel conduit for flowing the fuel in a first flow direction to the heating device and then to the filter element within the housing,
    wherein the component is a one-piece component separate from the filter element and sized and configured to extend through the fuel filter when the filter element is supported within the housing, in which the heating device, the detection device, and the outlet conduit are integrally formed into one-piece, and wherein the water inlet is provided on a lower end of the one-piece component for direct fluid communication with the reservoir when the component extends through the fuel filter, and the water outlet is provided on an upper end of the one-piece component, such that the water flows through the outlet conduit from the lower end to the upper end of the one-piece component in an opposite flow direction relative to the first flow direction of the fuel flowing through the fuel conduit of the component.

2. The component as defined by claim 1, further comprising a fuel inlet to the fuel conduit for carrying the fuel to the heating device and a fuel outlet from the fuel conduit for carrying away the fuel heated by the heating device, the fuel inlet and the fuel outlet being embodied in the one-piece component.

3. The component as defined by claim 2, further comprising an electrical plug embodied in the one-piece component.

4. The component as defined by claim 2, wherein the fuel conduit is embodied parallel to the outlet conduit for the water.

5. The component as defined by claim 1, further comprising an electrical plug embodied in the one-piece component.

6. The component as defined by claim 5, wherein the fuel conduit is embodied parallel to the outlet conduit for the water.

7. The component as defined by claim 6, wherein the heating device is embodied in the fuel conduit.

8. The component as defined by claim 1, further comprising an electric control device for controlling the heating device, the control device being disposed in the one-piece component.

9. The component as defined by claim 8, wherein the electric control device is additionally operable for controlling the detection device.

10. The component as defined by claim 8, wherein the fuel conduit is embodied parallel to the outlet conduit for the water.

11. The component as defined by claim 10, wherein the heating device is embodied in the first fluid conduit.

12. The component as defined by claim 1, wherein the fuel conduit is embodied parallel to the outlet conduit for the water.

13. The component as defined by claim 12, wherein the heating device is embodied in the fuel conduit.

14. The component as defined by claim 1, wherein the fuel is diesel fuel.

15. The component as defined by claim 1, further comprising a temperature sensor embodied in the one-piece component.

16. The component as defined by claim 1, wherein, the one-piece component is configured to be mounted in the housing with the water inlet in direct fluid communication with the reservoir and the water outlet outside the housing.

17. The component as defined by claim 1, wherein the one-piece component is molded from a plastic.

18. The component as defined by claim 1, further comprising an elongated unitary body defining said outlet conduit, said water inlet, said water outlet and said fuel conduit, wherein said heating device and said detection device are supported directly by said unitary body, and wherein said elongated unitary body is sized and configured to extend through said filter element when the filter element is supported within the housing.

19. A fuel filter comprising:
    a housing defining a reservoir;
    a filter element supported within said housing separate from said reservoir; and
    a component supported by said housing and extending through the filter element, said component comprising;
        a heating device for heating a fuel within the housing,
        a detection device for detecting a level of water located in said reservoir of the housing,
        an outlet conduit for conveying the water,
        a water inlet in direct fluid communication with said reservoir and integrally joined to the outlet conduit, for carrying the water from the reservoir to the outlet conduit, and a water outlet separate from said water inlet and integrally joined to the outlet conduit, for carrying the water away from the outlet conduit, the water outlet configured to direct the water outside the housing when the water inlet is in communication with the reservoir, and a fuel conduit for flowing the fuel in a first flow direction to the heating device and then to said filter element within said housing, wherein the component is a one-piece component separate from the filter element and sized and configured to extend through the fuel filter supported within the housing, in which the heating device, the detection device, and the outlet conduit are integrally formed into one-piece, and wherein the water inlet is provided on a lower end of the one-piece component for direct fluid communication with the reservoir when the component is supported by said housing, and the water outlet is provided on an upper end of the one-piece component, such that the water flows through the outlet conduit from a lower end to an upper end of the one-piece component in an opposite flow direction relative to the first flow direction of the fuel flowing through the fuel conduit of the component.

20. The fuel filter as defined by claim 19, wherein:

said component further comprises an elongated unitary body defining said outlet conduit, said water inlet, said water outlet and said fuel conduit, said heating device and said detection device are supported directly by said unitary body, and said elongated unitary body is sized and configured to extend through said filter element when the filter element is supported within the housing.

* * * * *